United States Patent
Nielsen

(10) Patent No.: US 6,199,071 B1
(45) Date of Patent: Mar. 6, 2001

(54) METHOD AND APPARATUS FOR ARCHIVING HYPERTEXT DOCUMENTS

(75) Inventor: Jakob Nielsen, Atherton, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/832,025

(22) Filed: Apr. 1, 1997

(51) Int. Cl.$^7$ .................................................. G06F 17/30
(52) U.S. Cl. ................... 707/204; 704/3; 707/5; 707/10; 707/101; 707/501; 707/513; 709/225; 709/226; 713/151
(58) Field of Search .................. 707/204, 506, 707/501, 512, 513, 101, 522, 526, 5, 10, 100; 709/225, 226; 713/151; 704/3

(56) References Cited

U.S. PATENT DOCUMENTS

| | | | |
|---|---|---|---|
| 4,914,571 | 4/1990 | Baratz et al. | 364/200 |
| 4,982,344 | * 1/1991 | Jordan | 345/346 |
| 5,175,684 | * 12/1992 | Chong | 704/3 |
| 5,255,104 | 10/1993 | Kajigaya | 358/403 |
| 5,297,249 | * 3/1994 | Bernstein et al. | 395/156 |
| 5,317,646 | * 5/1994 | Sang, Jr. et al. | 382/9 |
| 5,333,237 | * 7/1994 | Stefanopoulos et al. | 706/10 |
| 5,355,472 | * 10/1994 | Lewis | 707/1 |
| 5,386,547 | 1/1995 | Jouppi | 395/425 |
| 5,440,678 | * 8/1995 | Eisen et al. | 707/537 |
| 5,486,686 | * 1/1996 | Zdybel, Jr. et al. | 235/375 |
| 5,506,984 | * 4/1996 | Miller | 707/10 |
| 5,530,852 | * 6/1996 | Meske, Jr. et al. | 709/206 |
| 5,568,640 | 10/1996 | Nishiyama et al. | 395/600 |
| 5,581,725 | 12/1996 | Nakayama | 395/449 |
| 5,671,391 | 9/1997 | Knotts | 395/470 |
| 5,692,073 | * 11/1997 | Cass | 382/219 |
| 5,706,496 | 1/1998 | Noguchi et al. | 395/603 |

(List continued on next page.)

FOREIGN PATENT DOCUMENTS 0 704 810 A1   9/1995  (EP) .............................. G06F/17/30

OTHER PUBLICATIONS

Digital Equipment Corporation, Alpha Architecture Handbook, Version 3, pp. 4–20, 4–21, 4–22, DEC Order No. EC–QD2KB–TE(1996).

Hewlett–Packard, PA–RISC 1.1 Architecture and Instruction Set Reference Manual, Third Edition, pp. 5–51, 5–56, 5–62, 5–67, 5–105, 5–158, 5–159, HP Part No. 09740–90039(1986–1994).

SPARC International, The SPARC Architecture Manual, Version 8, pp. 104, 106, 108, 275, 276, 277, Appendix–A–83, Prentice–Hall, Inc., Englewood Cliffs, New Jersey(1992).

IBM Technical Disclosure Bulletin, Jan. 1988, vol. 30, No. 7, p. 33.

"Instant HTML Web Pages", Wayne Ause, Ziff–Davi Press, 1995, ISBN 1–56276–363–6, Pages Title–15(10 Pages).

"Hypertext Markup Language–2.0", T. Berners–Lee & D. Connolly, MIT/W3C, Nov. 1995, Network Working Group, 35 Pages.

"Relative Uniform Resource Locators", R. Fielding, UC Irvine, Jun. 1995, Network Working Group, 8 Pages.

(List continued on next page.)

Primary Examiner—Jack Choules
Assistant Examiner—Shahid Alam
(74) Attorney, Agent, or Firm—Thelen, Reid & Priest, LLP

(57) ABSTRACT

Apparatus, methods and computer program products are disclosed for archiving a hypertext document that contains a hyperlink definition. Archiving is the process of rendering a hypertext document for storage in a noninteractive form (for example, printing a copy of the hypertext document). The archival copy of the hypertext document presents the reader with a URL, contained in the hyperlink definition, as an embedded note, a footnote, or an endnote. Thus a reader of the archived hypertext document knows the URL associated with the hyperlink definition.

21 Claims, 9 Drawing Sheets

U.S. PATENT DOCUMENTS

| | | | |
|---|---|---|---|
| 5,708,825 | * 1/1998 | Sotomayor | 395/762 |
| 5,727,129 | * 3/1998 | Barrett et al. | 706/10 |
| 5,751,943 | * 5/1998 | Benzenberg et al. | 707/500 |
| 5,781,913 | * 7/1998 | Felsenstein et al. | 707/501 |
| 5,781,914 | * 7/1998 | Stork et al. | 707/506 |
| 5,809,317 | * 9/1998 | Kogan et al. | 707/501 |
| 5,812,995 |   9/1998 | Sasaki et al. | 707/1 |
| 5,822,539 | * 10/1998 | van Hoff | 395/200.66 |
| 5,835,712 | * 11/1998 | DuFresne | 395/200.33 |
| 5,862,325 | * 1/1999 | Reed et al. | 395/200.31 |
| 5,870,767 | * 2/1999 | Kraft, IV | 707/501 |
| 5,877,765 | * 3/1999 | Dickman et al. | 345/349 |
| 5,963,205 | * 10/1999 | Sotomayor | 345/333 |
| 5,978,818 | * 11/1999 | Lin | 707/501 |
| 5,982,445 | * 1/2000 | Eyer et al. | 348/461 |

OTHER PUBLICATIONS

"Uniform Resource Locators (URL)", T. Berners–Lee, Masinter & McCahill, Xerox Corporation, University of Minnesota, Dec. 1994, 13 Pages.

Borek, S. E., "A Hypertext Markup Language Interface for Multi–Product Data Libraries", IEEE Information Technology Conference, Sep. 1–3, 1998., pp. 166–171.*

Franchi, S. et al., "Multimedia Prespectives for next generation PAC Systems", Proceedings of the Fifth Annual IEEE Symposium on Computer–based Medical Systems, Jun. 14–17 1992, pp. 156–169.*

Hughes, J.S. et al., "The Planetary Data System Web Vatalog interface–another use of the Planetary Data System Data Model", Proceedings of the Fourteenth IEEE Symposium on Mass Storage Systems, 'Storage—At the Forefront of Information Infrastructu, Sep. 1995.*

Wahle, A. et al., "DICOM–Integration in a heterogeneous environment", 18th Annual International Conference of the IEEE Engineering in Medicine and Biology Society, Bridging Disciplines for Biomedicine, Oct. 31–Nov. 3, 1998, vol. 3, pp. 1228–1229.*

* cited by examiner

```
100
  ↘     <!-- HEAD_START -->
        <HTML>
101 {   <HEAD>
        <TITLE>A Title Line</TITLE>
        </HEAD>
        <!-- HEAD_END -->

103 — <b><a href="/developers/chat.html">First Hyperlink</a></b><p>
105 { <b><a> href="http://www.javasoft.com/products/hotjavaviews/">Second
      Hyperlink</a></b><p>
107 — <b><a href="#AIReference">An Internal Reference</a></br></br></br></br>

109 — <A NAME="AIReference" /A>An Internal Reference<br>
      <br>
```

FIG. 1A
(PRIOR ART)

```
          First Hyperlink
123 {     Second Hyperlink                          120
          An Internal Reference 125 —  An Internal Reference
121
```

FIG. 1B

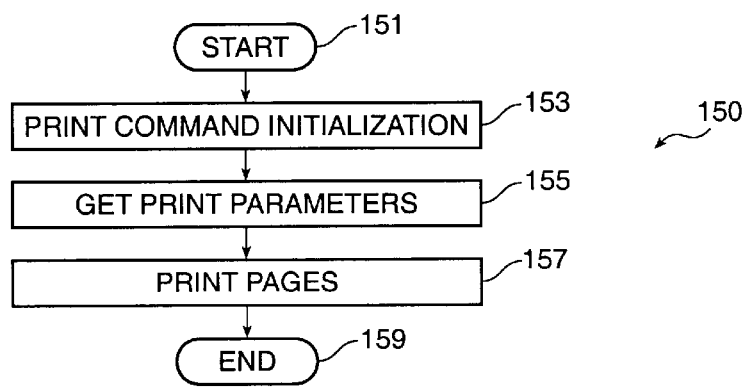

FIG. 1C
(PRIOR ART)

METHOD AND APPARATUS FOR ARCHIVING HYPERTEXT DOCUMENTS

BACKGROUND OF THE INVENTION

1. Field of the Invention

This invention relates to the field of hypertext systems. Specifically, this invention is a new and useful method, apparatus and computer program product for archiving hyperlinks contained in hypertext documents.

2. Background

The World Wide Web (WWW) is a massive hypertext system accessed by a computer user using an information access apparatus such as a WWW browser computer application. The WWW browser application communicates with an information provider executing on a computer apparatus to obtain information and services in the form of a hypertext document. The hypertext document can represent a variety of information, including, but not limited to, news, mail, documentation, menus of options, database queries and results, simple documents with graphics, and hypertext views of bodies of information. The background of the WWW is described by reference to the first chapter of *Instant HTML Web Pages,* by Wayne Ause, Ziff-Davis Press, ISBN 1-56276-363-6, copyright 1995, pages 1–15, hereby incorporated by reference as illustrative of the prior art.

The hypertext document is identified in the WWW context by a universal resource locator (URL). The URL specification, also incorporated by reference, is described in RFC1738 and can be found on the WWW at:

http://andrew2.andrew.cmu.edu/rfc/rfc1738.html

Briefly, the URL contains a protocol specification and a path specification. The protocol specification notifies the browser of what protocol to use when accessing a remote server containing the hypertext document. The path specification is generally a hierarchical path that specifies a data server followed by a hypernode (such as a hypertext web page document) that actually provides the information for the browser.

The currently presented hypertext document is termed the base document. The base document often includes one or more hyperlinks to related information outside the base document. A hyperlink is a labeled relationship to a resource. A hyperlink generally contains a user-meaningful label and an identifier of the referenced resource. Activating the hyperlink often results in accessing a completely different hypertext document supplied from completely different WWW server applications on other computer systems.

In HTML (Hyper Text Markup Language) a commonly used markup language that describes the hypertext document a hyperlink can be defined by an anchor (specified by an <A> element). The anchor contains a number of attributes, one of which can be an HREF attribute. The HREF attribute identifies a portion of the hyperlink that specifies the URL. The URL specified by the HREF attribute may be an absolute URL or a relative URL. The absolute URL is the URL in its complete form. It includes the scheme, network location and the URL-path. The relative URL is a compact representation of the location of a resource relative to an absolute URL. The relative URL is parsed from an absolute URL using the protocol specified in RFC1808. RFC1808 can be found on the WWW at:

http://andrew2.andrew.cmu.edu/rfc/rfc1808.html

The absolute URL may also be derived from the relative URL using the protocol described in RFC1808(4).

FIG. 1*a* illustrates a sample of HTML data as indicated by general reference character 100. The HTML data sample 100 includes a head section 101 that contains HTML header information. The HTML data sample 100 also contains a relative hyperlink anchor 103 that contains an (Hypertext Reference) attribute that specifies a hyperlink to a file named "chat.html" within a directory named "developers" that is a subdirectory of a base directory known to the browser. The HTML data sample 100 also contains an absolute hyperlink anchor 105 that provides the absolute URL. Also, the HTML data sample 100 includes a base document fragment anchor 107 that provides a hyperlink to a named section in the base document. The named section in the base document is defined by a fragment defining anchor 109. One version of the HTML specification is defined by RFC1866 and can be found on the WWW at:

http://andrew2.andrew.cmu.edu/rfc/rfc1866.html

FIG. 1*b* illustrates a presentation of the HTML data sample 100 as indicated by general reference character 120. The presentation 120 is generated by a browser application that processed the HTML data within the base document. The presentation 120 is similar regardless of whether it is displayed on a computer display with active hyperlinks or stored in an archival form such as a printed page. When a browser application displays the presentation 120 on a computer display, the information is presented in a window 121. Each of a plurality of displayed hyperlinks 123 is indicated by the display text provided within the anchor definition of the corresponding HTML markup as is well known in the art. A fragment text 125 starts after the fragment defining anchor 109. When a browser application displays the presentation 120 on a computer display, the user can select any of the plurality of displayed hyperlinks 123 to present the information referenced by that hyperlink. However, when the browser application archives the presentation 120 (such as on a printed page), the reader of the archive cannot determine the location of the information referenced by the hyperlink. The only information the reader receives is the display text associated with the URL by the hyperlink. Thus, the reader is unable to access the information referenced by the hyperlink.

FIG. 1*c* illustrates an overview of a 'prior art print processing' process as indicated by general reference character 150. The process initiates at a 'start' terminal 151 and continues to a 'print command initialization' procedure 153 that initializes the print command options. Then a 'get print parameters' procedure 155 displays a dialog and retrieves print information and options such as the number of copies, the page range to be printed and other printing related information from the user. Next a 'print pages' procedure 157 prints the pages in accordance with the print command options. The process completes through an 'end' terminal 159.

To summarize, the 'prior art print processing' process 150 does not archive the hyperlinks contained in the base document because the URLs contained in the hyperlinks are not printed. Although a display, presented by a browser application, of a hypertext document described by HTML indicates hyperlinks and the hyperlink's URL, the archived document (such as a printed version of the hypertext document) does not. Thus, an archived hypertext document does not provide the URL for the hyperlink. Only the display text associated with the URL by the hyperlink is printed. Thus, a reader of the printed document does not have the URL associated with the hyperlink and thus the information referenced by the hyperlink is not accessible to the reader. One skilled in the art will understand that saving the HTML data describing the document will save the URL specifications within the document. However, finding the URL of interest when it is embedded within the HTML definition of a document is often difficult and time consuming for the average WWW user. Another approach is to save the HTML statements in a file. This saved HTML file can be later input to a WWW browser so that the hyperlinks can be accessed in the normal manner. The difficulty with this approach is that users often prefer to keep paper images (often for filing with other information that is not from a computer source—such as a news clipping etc.). Additionally, handouts and seminar and conference proceedings are now being created in hypertext form. However, paper copies of these handouts and proceedings do not include the hyperlinks addresses. Finally, when the document is archived onto paper, the user can physically write the URL on the paper. However, physically writing the URL on the paper is both error prone and often difficult to read by another.

SUMMARY OF THE INVENTION

The present invention provides an economical apparatus, method, and computer program product for archiving a hypertext document that contains a hyperlink definition. The method includes the step of detecting the hyperlink definition within the hypertext document. The method also includes the step of archiving a portion of the hyperlink definition.

Another aspect of the invention is an apparatus, including a central processing unit coupled to a memory, for archiving a hypertext document. The hypertext document contains a hyperlink definition. The apparatus also includes a hypertext detection mechanism that is configured to detect the hyperlink definition that is within the hypertext document. The apparatus also includes a hypertext archival mechanism that is configured to archive a portion of the hyperlink definition that was detected by the hypertext detection mechanism.

Yet a further aspect of the invention is a computer program product embedded on a computer usable medium for causing a computer to archive a hypertext document containing a hyperlink definition. When executed on a computer, the computer readable code causes a computer to effect a hypertext detection mechanism and a hypertext archival mechanism. Each of these mechanisms having the same functions as the corresponding mechanisms for the previously described apparatus.

The foregoing and many other aspects of the present invention will no doubt become obvious to those of ordinary skill in the art after having read the following detailed description of the preferred embodiments that are illustrated in the various drawing figures.

DESCRIPTION OF THE DRAWINGS

FIGS. 1a and 1c illustrates aspects of the prior art;

FIG. 1b illustrates a presentation of the HTML data sample

DESCRIPTION OF THE PREFERRED EMBODIMENTS

Notations and Nomenclature

Figure 2:
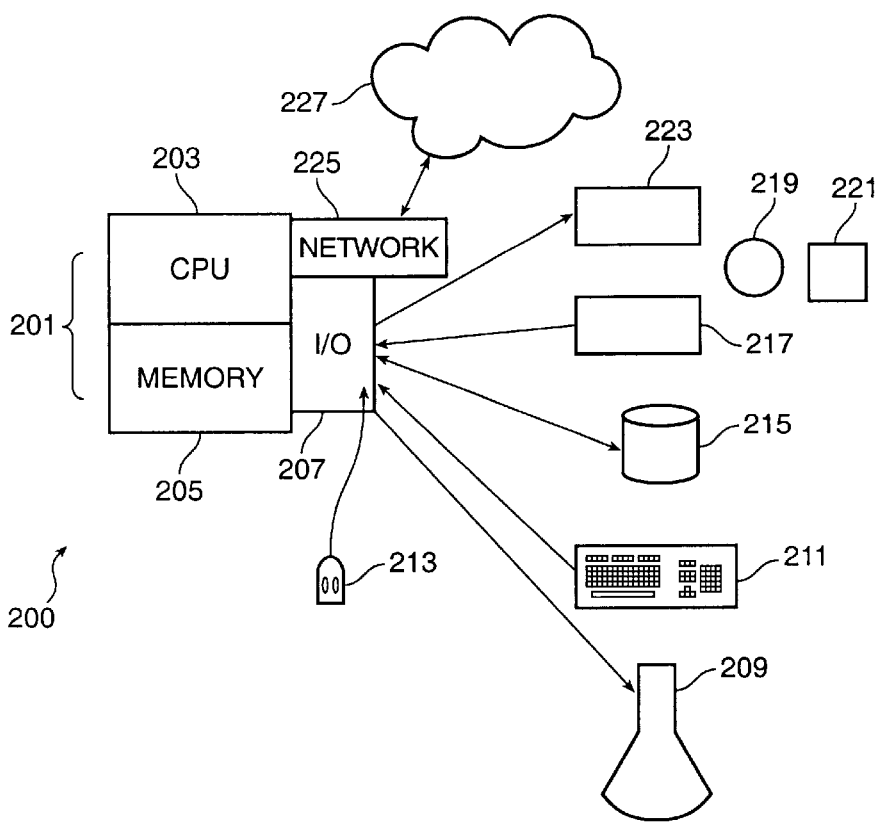
FIG. 2 illustrates a computer system capable of using the invention in accordance with a preferred embodiment.

The following 'notations and nomenclature' are provided to assist in the understanding of the present invention and the preferred embodiments thereof.

Archiving—Archiving is the process of rendering a hypertext document for storage in a noninteractive form. This noninteractive form includes, without limitation, printing the hypertext document on a tangible media such as paper and saving an image of a displayed hypertext document (that is, as a raster image in any number of different formats) to a file in a filestorage. Archiving does not include saving the HTML data describing the hypertext document.

Graphical User Interface (GUI)—A user interface that allows a user to interact with a computer display by pointing at selectable control areas on the display and activating a command or computer operation associated with the selectable control area. GUIs are well known in the art.

Pointing device—A device that is responsive to a computer user's input that moves an indicator on a computer display screen. Such an indicator has an active point such that if the pointing device is activated (for example, by a button push for a mouse device), a command associated with the selectable control area covered by the active point is invoked. Pointing devices are generally used with graphical user interfaces.

Selectable control area—An area on a computer display that is sensitive to activation of a pointing device. When the pointing device is activated over the selectable control area, a command or computer operation associated with the selectable control area is invoked. Most computer systems that provide a graphical user interface (GUI) also provide other methods for invoking these commands or computer operations such as keyboard function keys or command lines.

Procedure—A procedure is a self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing opcodes are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (for example, mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

One skilled in the art will understand that, although the figures and illustrations use a particular bit ordering within the computer memory word, the actual bit ordering is irrelevant to the invention. Further, one skilled in the art will understand that illustrations of data structures in memory start at the lower addressed memory at the top of the structure and extend to higher addressed memory.

Operating Environment

Some of the elements of a computer, as indicated by general reference character 200, configured to support the invention are shown in FIG. 2 wherein a processor 201 is shown, having a central processor unit (CPU) 203, a memory section 205 and an input/output (I/O) section 207. The input/output (I/O) section 207 is connected to a display unit 209, a keyboard 211, a mouse 213, a disk storage unit 215 and a CD-ROM drive unit 217. The CD-ROM drive unit 217 can read a CD-ROM medium 219 that typically contains a program and data 221. A CD-ROM drive unit 217, along with the CD-ROM medium 219, and the disk storage unit 215 comprise a filestorage mechanism. The computer 200 also includes an archival device 223 such as a printer. The computer 200 also includes a network interface 225 for connecting the computer 200 to a network 227. Such a computer system is capable of executing applications that embody the invention. Although the network 227 and the network interface 225 are not required to practice the invention, one skilled in the art will understand that browser applications often access information through the network 227.

Modern computer systems generally provide a graphical user interface (GUI) to allow the computer user to interact with the computer. The computer system requests information from the user by presenting a dialog to the user. The user selects and provides parameters to selectable control areas (SCA) in the dialog to specify how the operation associated with the dialog is to be performed.

Figure 3:
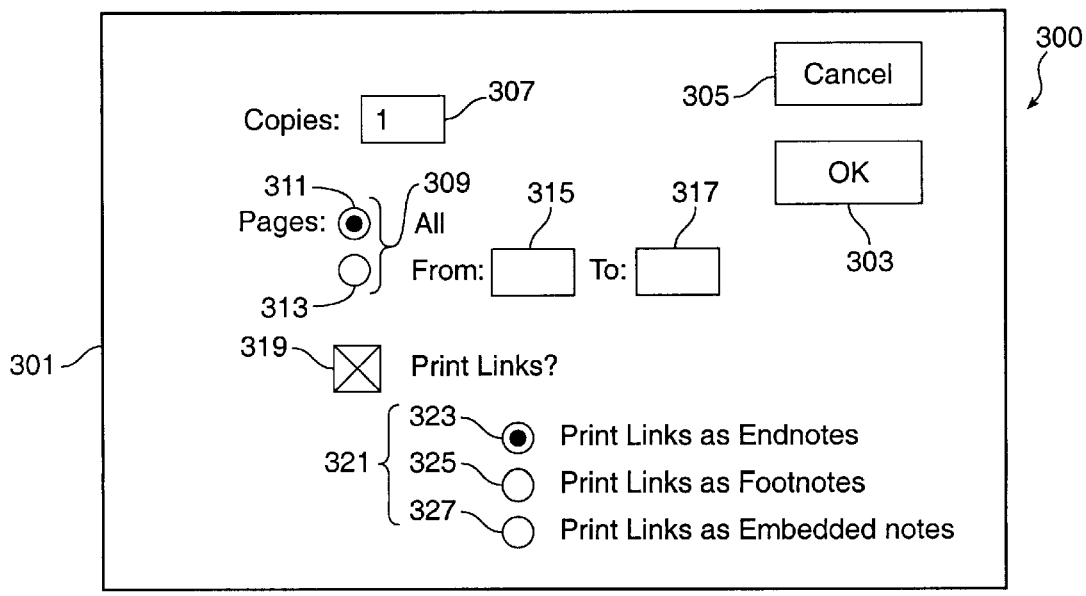
FIG. 3 illustrates a dialog used to invoke the invention in accordance with a preferred embodiment.

FIG. 3 illustrates a print command dialog indicated by general reference character 300. The information and SCAs in the print command dialog 300 are enclosed in a window 301. The window 301 contains a confirmation SCA 303 that a user activates to accept the parameters specified by the SCAs within the print command dialog 300 and to invoke the print process on the document to be printed (the relevant document). The window 301 also includes a cancel SCA 305 that the user activates to cancel the invocation of the print process. Further, a 'number of copies desired' SCA 307 allows the user to specify how many copies are to be printed once the dialog is accepted. A first plurality of radio buttons 309 allows the user to specify one of an 'all pages' radio button 311 or a 'page range' radio button 313. When the 'all pages' radio button 311 is selected, the print process prints all the pages in the relevant document. When the 'page range' radio button 313 is selected, the print process prints the specified range of pages in the relevant document. The range of pages is specified using a 'start range' SCA 315 and an 'end range' SCA 317. The invention is enabled if the user activates a 'print links' checkbox SCA 319 at which point a second plurality of radio buttons 321 are enabled. The second plurality of radio buttons 321 includes an endnote radio button 323, a footnote radio button 325, and an 'embedded note' radio button 327. On activation of the 'print links' checkbox SCA 319, the second plurality of radio buttons 321 is initialized so that one of the second plurality of radio buttons 321 is selected by default. If the endnote radio button 323 is selected, the invention will print the URL of relevant hyperlinks as endnotes to the printed document. If the footnote radio button 325 is selected, the invention will print the URL of relevant hyperlinks as footnotes on the printed page containing the relevant hyperlinks. Finally, if the 'embedded note' radio button 327 is selected, the invention will print the URL of relevant hyperlinks as embedded notes adjacent to the relevant hyperlink. A relevant hyperlink is one that references information outside the base document. Thus, hyperlinks that refer to anchors within the base document are not printed since they would not guide a reader to access a new hypertext page. For HTML documents a relevant hyperlink is one that uses the HREF attribute and does not refer to an anchor in the base document.

Figure 4:
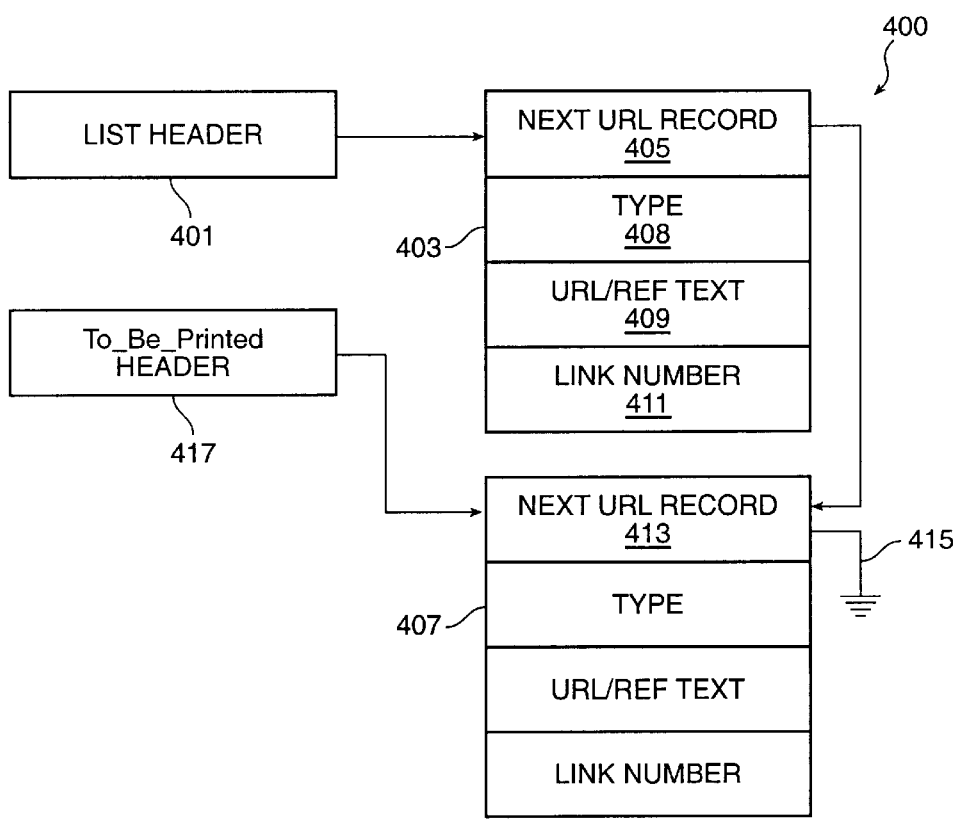
FIG. 4 illustrates a data structure in memory used to store references to hyperlinks in accordance with a preferred embodiment.

FIG. 4 illustrates a data structure in memory indicated by general reference character 400 that maintains information about relevant hyperlinks. The data structure 400 is used when the user selects the endnote radio button 323 or the footnote radio button 325. The data structure 400 is not used when the user selects the 'embedded note' radio button 327. A list header 401 contains a NIL pointer (a pointer having a value of zero) if the data structure 400 is empty. If the data structure 400 is not empty, the list header 401 contains a pointer to a first URL structure 403. The first URL structure 403 contains information about the first relevant hyperlink encountered in a hypertext document. A 'next URL pointer' field 405 contains a pointer to a second URL structure 407 or is NIL. A 'URL type' field 408 indicates whether a 'URL/REF text' field 409 contains a URL text string or a reference text string. The reference text string is a string of text that refers to a URL text string (for example, a reference text string could be "See note 2"). A URL text string is the hyperlink's URL. A 'link number' field 411 in the first URL structure 403 contains the reference number assigned to the footnote (that is, the value of the Num_Links variable) at the time the first URL structure 403 is initialized. The last URL structure has NIL as the value of the 'next URL pointer' field 405. Thus, in FIG. 4 the second URL structure 407 is the last entry in the data structure 400 because a 'next URL pointer' field 413 in the second URL structure 407 is NIL as indicated by a 'NIL pointer' indicator 415. A 'To_Be_Printed' header 417 points to the 'next URL pointer' field 405 of the last URL structure archived. It initially points to the list header 401. Thus, when printing footnotes, the invention determines whether any new URL structures have been added to the data structure 400 since the last page was printed. If new URL structures have been added, the process prints the footnotes starting at the URL structure pointed to by the last printed URL structure.

The data structure 400 is constructed when the invention archives a hypertext page and the user has specified that the links are to be printed (by selecting the 'print links' checkbox SCA 319 and either the endnote radio button 323 or the footnote radio button 325). The invention adds URL structures to the data structure 400 as it processes appropriate hyperlinks in the hypertext page as is subsequently described.

Figure 5:
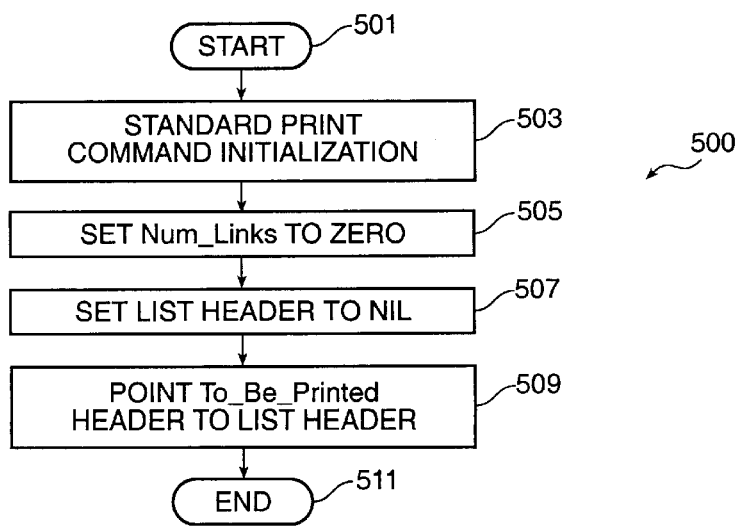
FIG. 5 illustrates an initialization processes in accordance with a preferred embodiment.

FIG. 5 illustrates a print command initialization process indicated by general reference character 500 that is invoked once a user has selected the confirmation SCA 303 as described for FIG. 3. The initialization process 500 initiates at a 'start' terminal 501 and continues to a 'standard print command initialization' procedure 503 that performs any prior art initialization procedures. Next, the initialization process 500 continues to a 'set Num_Links to zero' procedure 505 that initializes the variable Num_Links to zero. Num_Links is a counter that is incremented whenever a relevant hyperlink is encountered. A relevant hyperlink is one that references information outside of the base document. In a HTML document a relevant hyperlink is one specified by the HREF attribute in an anchor that references a resource outside the base document. A 'set List header to NIL' procedure 507 initializes the list header 401 to NIL. A 'set To_Be_Printed header to List header' procedure 509 then initializes the contents of the 'To_Be_Printed' header 417 to point to the list header 401. Finally, the initialization process 500 completes through an 'end' terminal 511.

Figure 6A:
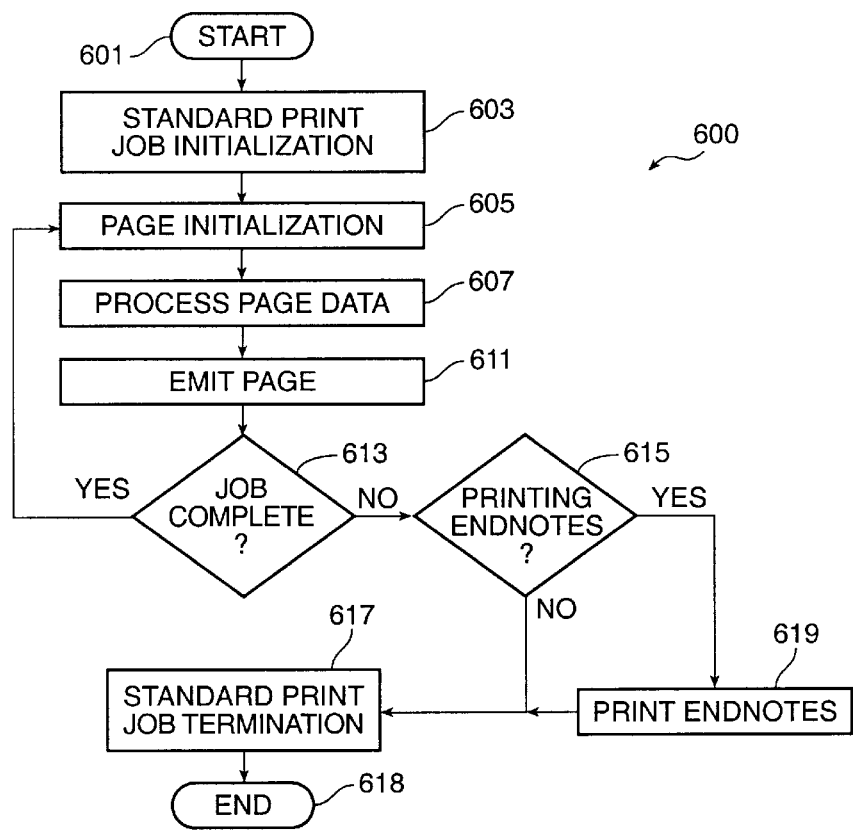
FIGS. 6a–d illustrates the process used to extract hyperlinks in accordance with a preferred embodiment.

FIG. 6a illustrates a print process indicated by general reference character 600 that initiates at a 'start' terminal 601 and continues to a 'standard print job initialization' procedure 603. The 'standard print job initialization' procedure 603 performs prior art initialization for the print job. The print process 600 continues to a 'page initialization' procedure 605 that performs per-page initialization. This per-page initialization includes resetting the remaining space variable to its initial value and resetting the current page position to the page's starting position as well as any other initialization known to those skilled in the art. Next, a 'process page data' procedure 607 processes statements used to describe a page—thus rendering the page. One skilled in the art will understand that many hypertext documents are described using HTML and that for web pages the 'process page data' procedure 607 processes HTML elements. The print process 600 continues to an 'emit page' procedure 611 to print the rendered page. After the page is emitted, the print process 600 continues to a 'job complete' decision procedure 613 that determines whether the print job is completed. The print process 600 loops back to the 'page initialization' procedure 605 to process the next page if not all the statements have been consumed. If, at the 'job complete' decision procedure 613, all statements have been consumed, the print process 600 continues to a 'printing endnotes' decision procedure 615 that checks the state of the 'print links' checkbox SCA 319 and the endnote radio button 323 resulting from the print command dialog 300 to determine whether the user has selected endnote processing. If the user has not selected endnote processing the print process 600 continues to a 'standard print job termination' procedure 617 that performs standard print job termination processing. Finally, the print process 600 completes through an 'end' terminal 618. If the 'printing endnotes' decision procedure 615 determines that the user selected the endnote processing option, the print process 600 continues to a 'print endnotes' procedure 619. The 'print endnotes' procedure 619 is subsequently described. One skilled in the art will understand that the invention can be practiced with hypertext languages other than HTML. One skilled in the art will also understand that the print process 600 is one example of how to archive a hypertext document and that other embodiments may archive the hypertext document to other devices in the computer 200.

Figure 6B:
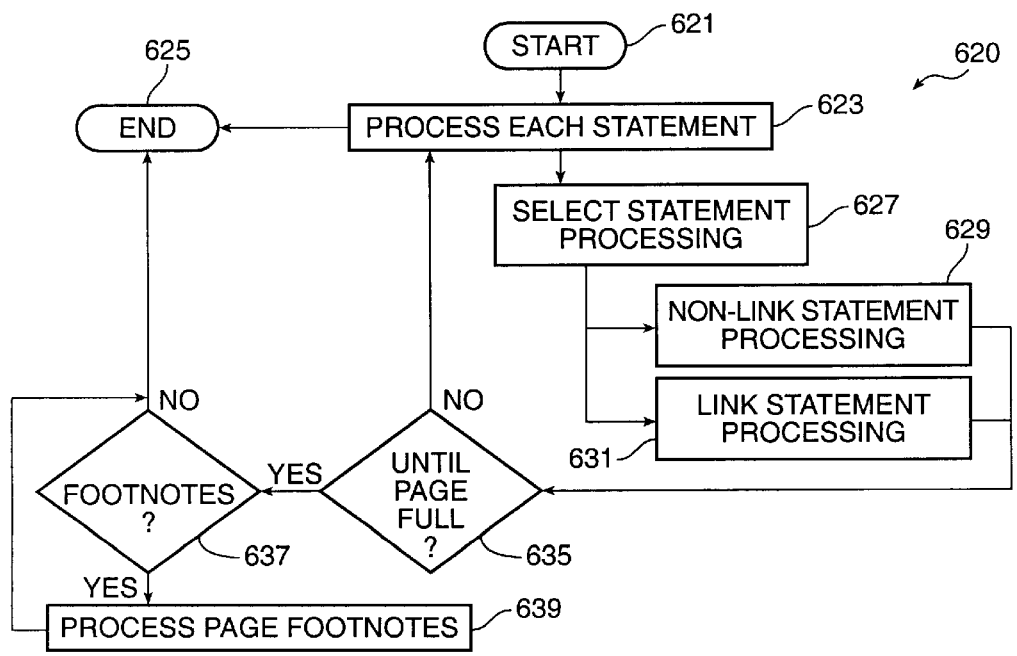

FIG. 6b illustrates a print process indicated by general reference character 620 that corresponds to the 'process page data' procedure 607 (shown in FIG. 6a). The print process 620 initiates at a 'start' terminal 621 and continues to a 'process each statement' iterative procedure 623 that iterates through the statements describing the hypertext document (such as HTML elements) until a page is full. If the 'process each statement' iterative procedure 623 consumes all the statements, the print process 620 then completes through an 'end' terminal 625. Each statement iterated by the 'process each statement' iterative procedure 623 is dispatched by a select procedure 627 that detects whether the iterated statement is a hyperlink definition statement or a nonlink statement. If the iterated statement is a nonlink statement, the select procedure 627 selects a 'nonlink statement processing' procedure 629 that processes the nonlink statement according to the prior art. However, if the iterated statement is a hyperlink definition statement, the select procedure 627 selects a 'link statement processing' procedure 631 that performs the prior art processing along with the processing involved for a preferred embodiment as is subsequently described. Regardless of which processing is performed, the print process 620 then advances to an 'until page full' decision procedure 635 that determines whether the page is full. This determination is accomplished by reducing the space available to the page in the 'nonlink statement processing' procedure 629 and the 'link statement processing' procedure 631 and detecting when too little available space is available to process the next statement. One skilled in the art will understand that this determination can be performed at other positions in the print process 620. If, at the 'until page full' decision procedure 635, the page is not full, the print process 620 then repeats back to the 'process each statement' iterative procedure 623 to process the next statement. However, if the page is full, the print process 620 continues to a 'processing footnote' decision procedure 637 that determines whether the user has selected footnote processing. If the user did not select footnote processing, the print process 620 completes through the 'end' terminal 625. However, if the user did select footnote processing the print process 620 continues to a 'process page footnotes' procedure 639 that inserts the relevant footnotes on the current page. From this, one skilled in the art will understand that the 'link statement processing' procedure 631 decreases the space available to the page dependent on the footnotes allocated to the page.

Figure 6C:
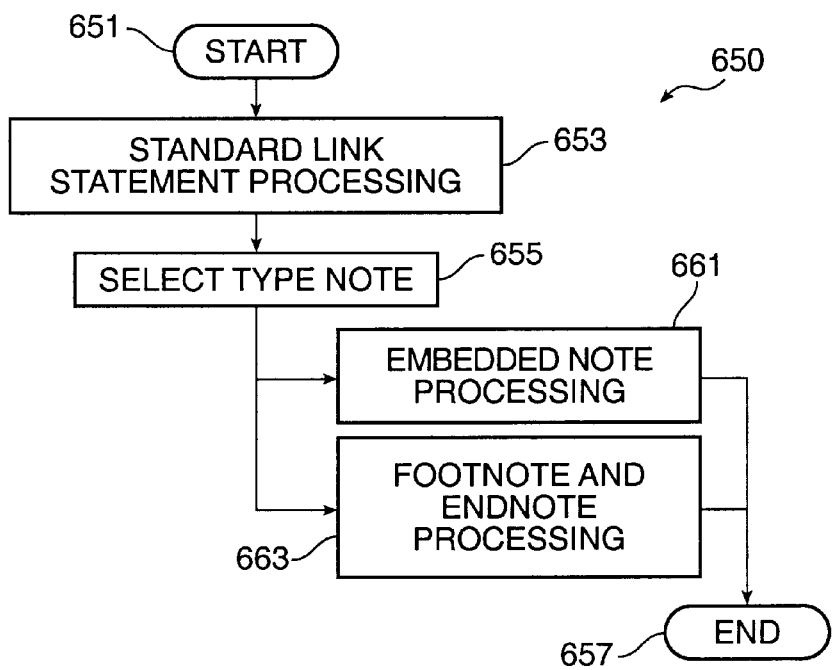
Figure 9A:
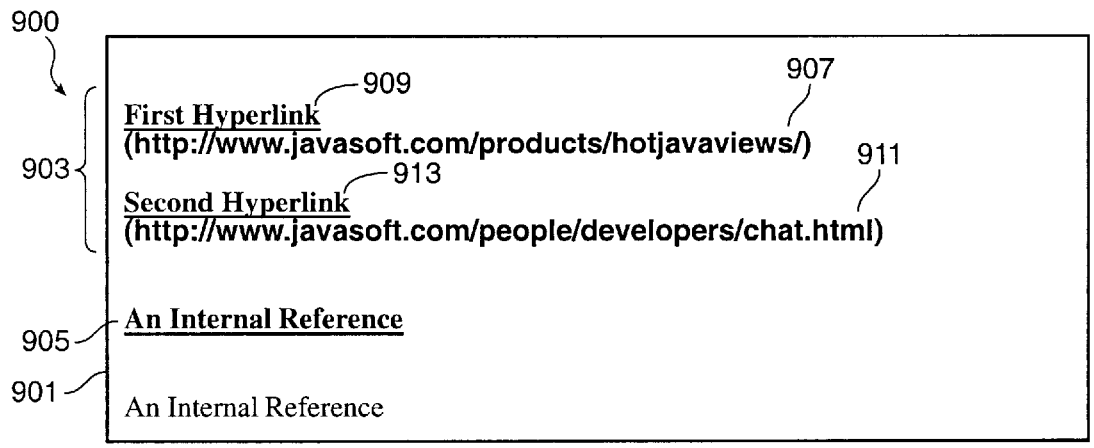
FIG. 9a–c illustrates example results of archiving a hypertext document in accordance with a preferred embodiment.

FIG. 6c illustrates a link statement processing process indicated by general reference character 650 that corresponds to the 'link statement processing' procedure 631 of FIG. 6b. The link statement process 650 initiates through a 'start' terminal 651 and continues to a 'standard link statement processing' procedure 653 that performs existing prior art link statement processing on the hyperlink definition statement. This processing includes printing the display text associated with the hyperlink. The link statement process 650 then continues to a select procedure 655 that dispatches subsequent processing dependent on the user selected print link options. If the 'print links' checkbox SCA 319 was not selected, processing completes through an 'end' terminal 657. However if the 'print links' checkbox SCA 319 was selected, the select procedure 655 selects, dependent on the user's selection in the second plurality of radio buttons 321, either an 'embedded note' procedure 661 or a 'footnote or endnote' procedure 663. The 'embedded note' procedure 661 extracts the URL from the hyperlink and inserts it into the page surrounded by implementation dependent delimiters, such as "("and")", as is shown in FIG. 9a.

Figure 6D:
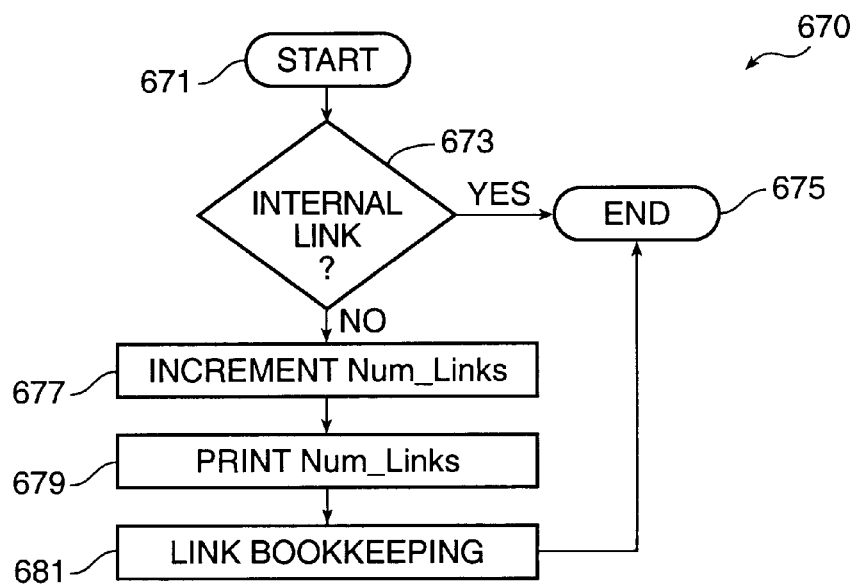

FIG. 6d illustrates a 'footnote and endnote processing' process indicated by general reference character 670. The 'footnote and endnote processing' process 670 is invoked from the 'footnote or endnote' procedure 663. The 'footnote and endnote processing' process 670 initiates at a 'start' terminal 671 and continues to a 'check for internal link' decision procedure 673. If the 'check for internal link' decision procedure 673 determines that the hyperlink references the base document, the 'footnote and endnote processing' process 670 completes through an 'end' terminal 675. However, if the 'check for internal link' decision procedure 673 determines that the hyperlink does not reference the base document the 'footnote and endnote processing' process 670 continues to an 'increment Num_Links' procedure 677 that increments the contents of the Num_Links variable. Then, the 'footnote and endnote processing' process 670 continues to a 'print Num_Links' procedure 679. The 'print Num_Links' procedure 679 prints the contents of the Num_Links variable as a note reference. In a preferred embodiment the note reference is printed as inverted text (white-on-black instead of black-on-white) and with a point size that is the smaller of the point size used for the last character of the text associated with the hyperlink and the default point size. Next, the 'footnote and endnote processing' process 670 continues to a 'link bookkeeping' procedure 681 that adds the information from the link into the data structure 400 as is subsequently described.

Figure 7:
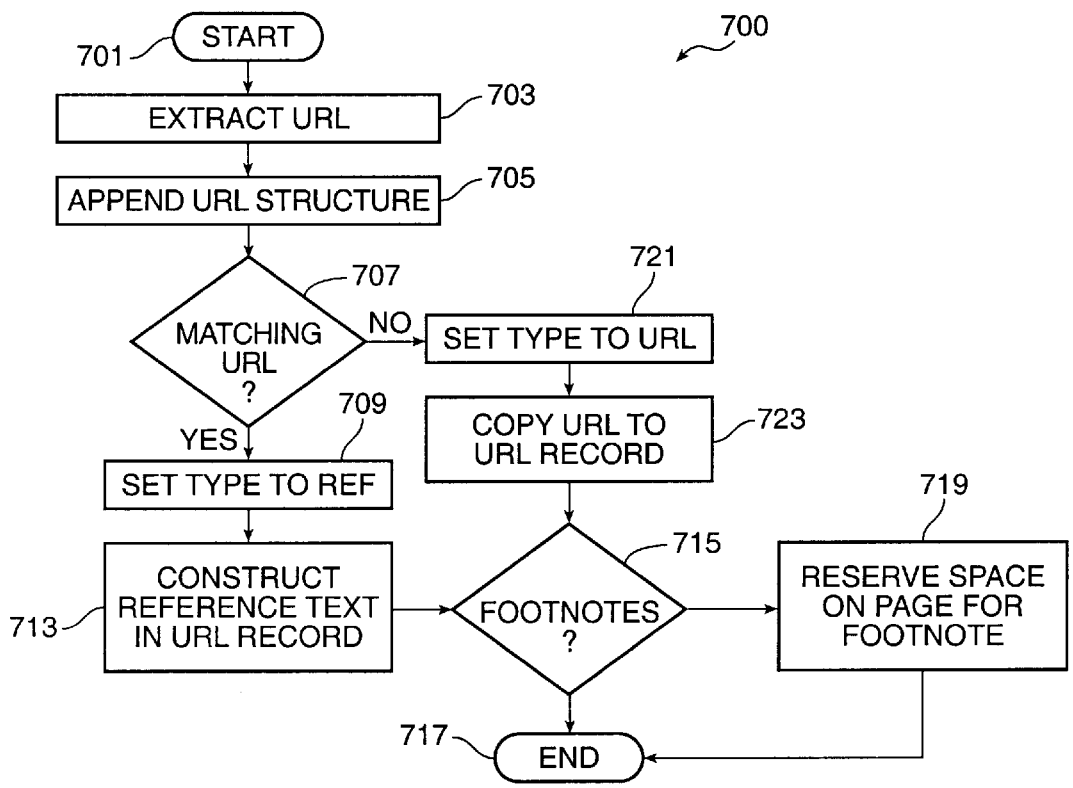
FIG. 7 illustrates the process used to add information to the data structure in memory in accordance with a preferred embodiment.

FIG. 7 illustrates an URL bookkeeping process indicated by general reference character 700. The bookkeeping process 700 is invoked by the 'link bookkeeping' procedure 681. The bookkeeping process 700 initiates at a 'start' terminal 701 and continues to an 'extract URL' procedure 703 that extracts and saves the URL from the hyperlink definition statement. If the extracted URL is a relative URL it is converted into an absolute URL. One skilled in the art understands how to create an absolute URL from a relative URL. An 'append URL structure' procedure 705 adds a new URL structure to the end of the data structure 400 using techniques well understood in the art. This new URL structure is initialized so that: the 'next URL pointer' field 405 is NIL, the 'URL type' field 408 is UNDEFINED, the 'URL/REF text' field 409 contains or references an empty text string, and the 'link number' field 411 is set to the current value of Num_Links. A 'matching URL' decision procedure 707 then searches the data structure 400 to determine whether one of the URL data structures already contains the URL extracted from the hyperlink definition statement. This search starts at the URL data structure pointed to by the list header 401. The 'URL type' field 408 of the URL data structure is then checked to determine whether the URL data structure is a REF or URL variant. If the URL data structure is a REF variant the URL data structure is skipped and the next URL data structure examined by following the pointer in the 'next URL pointer' field 405. However, if the URL data structure is a URL variant the contents of the 'URL/REF text' field 409 is compared with the extracted URL. If the extracted URL matches the contents of the 'URL/REF text' field 409, the bookkeeping process 700 continues to a 'set REF type' procedure 709. The 'set REF type' procedure 709 sets the new URL data structure (the one appended to the list during the 'append URL structure' procedure 705) to the REF variant. Next, a 'construct reference text' procedure 713 constructs a textual string referring to the note of the referenced URL data structure (that is, the URL data structure containing the URL that matches the extracted URL). This textual string is implementation dependent. A preferred embodiment uses "See note x" where "x" is the textual representation of the value in the 'link number' field 411 of the URL data structure that matched the extracted URL. Next a 'footnote processing' decision procedure 715 determines whether the user selected the 'print links' checkbox SCA 319 along with the footnote radio button 325. If the user did not make that selection, the bookkeeping process 700 completes through an 'end' terminal 717. However, if the user selected the footnote radio button 325 the bookkeeping process 700 continues to a 'reserve footnote space' procedure 719 that reduces the available space on the page by the space needed for the footnote. Then the bookkeeping process 700 completes through the 'end' terminal 717.

However, if at the 'matching URL' decision procedure 707 the extracted URL does not match the contents of the 'URL/REF text' field 409, the 'matching URL' decision procedure 707 continues scanning the data structure 400. If no URL data structure (URL variant) matches the extracted URL the bookkeeping process 700 continues to a 'set URL type' procedure 721. The 'set URL type' procedure 721 sets the new URL data structure (the one appended to the list during the 'append URL structure' procedure 705) to the URL variant. Then a 'copy URL' procedure 723 sets the 'URL/REF text' field 409 to contain, or refer to, the extracted URL. The bookkeeping process 700 then continues to the 'footnote processing' decision procedure 715 and processing continues as previously described.

The information in the data structure 400 is printed when the user has selected the 'print links' checkbox SCA 319 and either the endnote radio button 323 or the footnote radio button 325. If the user has selected the endnote radio button 323 the information in the URL data structures that make up the data structure 400 is printed after the body of the base document.

Figure 8A:
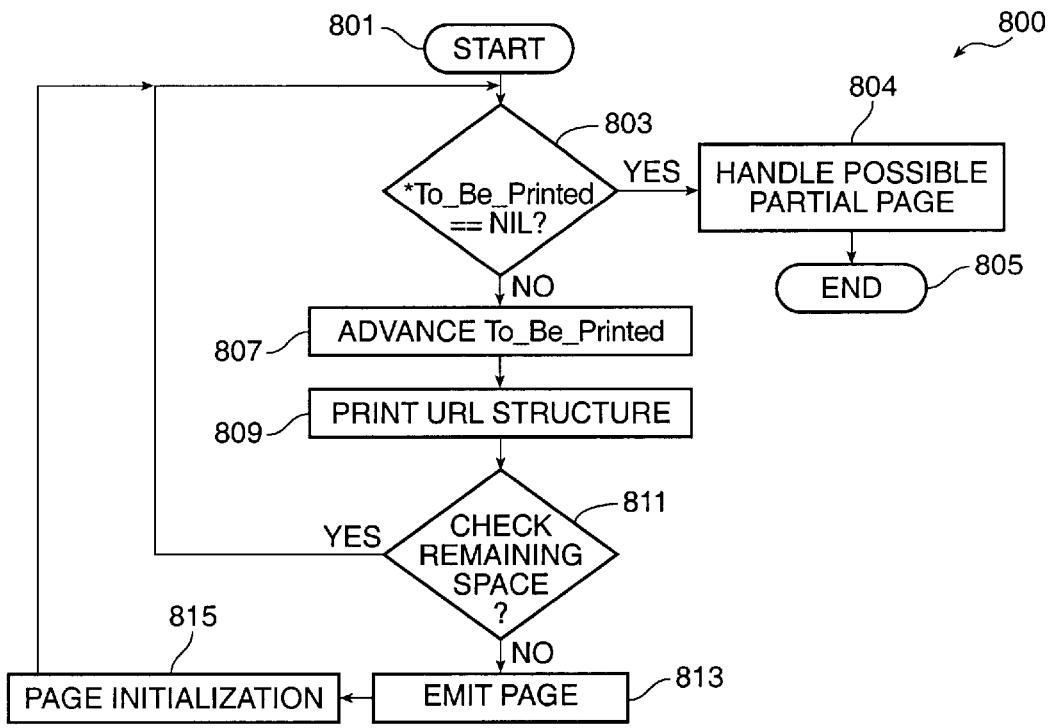
FIGS. 8a–b illustrates a process used to print endnotes and footnotes in accordance with a preferred embodiment.

FIG. 8a illustrates an endnote printing process indicated by general reference character 800 that is invoked by the 'print endnotes' procedure 619. The endnote printing process 800 initiates at a 'start' terminal 801 and continues to a 'list empty' decision procedure 803 that determines whether any URL data structures in the data structure 400 remain to be printed. A preferred embodiment determines that no further URL data structures remain to be printed when the value of the pointer, pointed to by the 'To_Be_Printed' header 417, is NIL. This occurs when the 'To_Be_Printed' header 417 points to the 'next URL pointer' field 405 of the last URL structure, or when it points to the list header 401 and the list header 401 contains a NIL value. If all the URL data structures have been processed the endnote printing process 800 continues to a 'process possible partial page' procedure 804 that emits any partial page. Then, the endnote printing process 800 completes through an 'end' terminal 805. Otherwise, the endnote printing process 800 continues to an 'advance To_Be_Printed' procedure 807 that advances the 'To_Be_Printed' header 417 to point to the next URL structure using methods well understood in the art. Next a 'print URL structure' procedure 809 prints the information in the URL structure by printing the value in the 'link number' field 411 in the appropriate font and point size followed by the text string stored in, or referenced by, the 'URL/REF text' field 409 followed by a new line character sequence. The endnote printing process 800 also reduces the amount of vertical space remaining on the page by the amount needed to print the text specified by the URL structure. Next, a 'check remaining space' procedure 811 checks the amount of vertical space remaining on the page and if sufficient the endnote printing process 800 loops back to the 'list empty' decision procedure 803 to iterate the next URL structure. However, if the remaining space is insufficient, the endnote printing process 800 continues to an 'emit page' procedure 813 and emits the page containing the endnotes. Then the endnote printing process 800 advances to an 'initialize page' procedure 815 to initialize the page and the amount of space remaining on the page. The endnote printing process 800 then loops back to the 'list empty' decision procedure 803 to iterate the next URL structure.

Figure 8B:
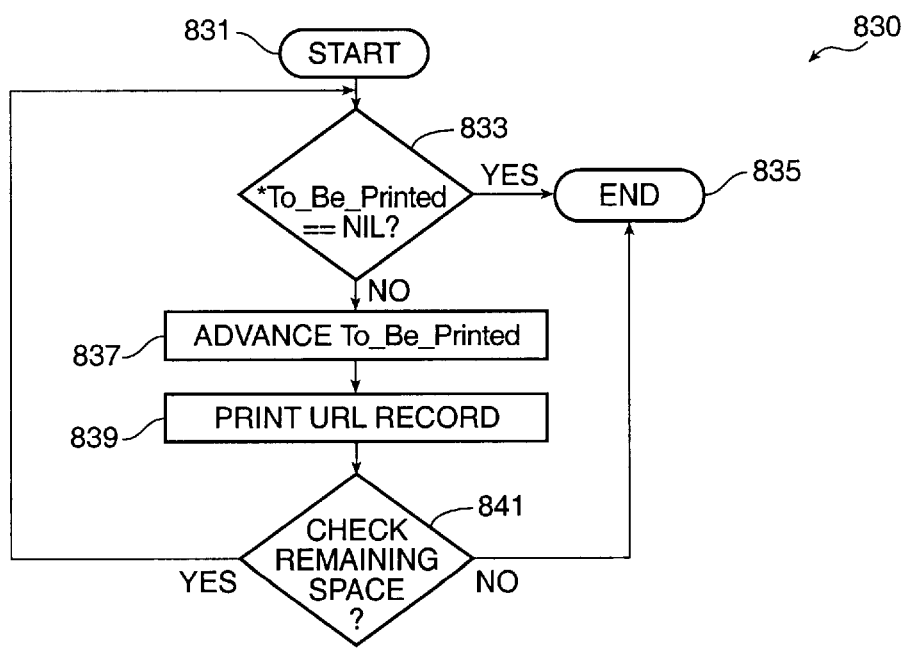

FIG. 8b illustrates a footnote printing process indicated by general reference character 830 that is invoked by the 'process page footnotes' procedure 639. The footnote printing process 830 initiates at a 'start' terminal 831 and continues to a 'list empty' decision procedure 833 that determines whether any URL data structures in the data structure 400 remain to be printed using techniques previously discussed related to FIG. 8a. If all the URL data structures have been processed, the footnote printing process 830 completes through an 'end' terminal 835. Otherwise, the footnote printing process 830 continues to an 'advance To_Be_Printed' procedure 837 that advances the 'To_Be_Printed' header 417 to point to the next URL structure using methods well understood in the art. Next a 'print URL record' procedure 839 prints the information in the URL structure by printing the value in the 'link number' field 411 in the appropriate font and point size followed by the text string stored in or referenced by the 'URL/REF text' field 409 followed by a new line character sequence. Next, a 'check remaining space' procedure 841 checks the reserved vertical space remaining on the page (reserved by the 'reserve footnote space' procedure 719) and if below a limit the footnote printing process 830 completes through the 'end' terminal 835. Otherwise, the footnote printing process 830 loops back to the 'list empty' decision procedure 833 to iterate the next URL structure. The invention results in an archive of the base document that presents the URL of the base document's hyperlinks with those hyperlinks either as an embedded note, a footnote or an endnote.

Figure 9B:
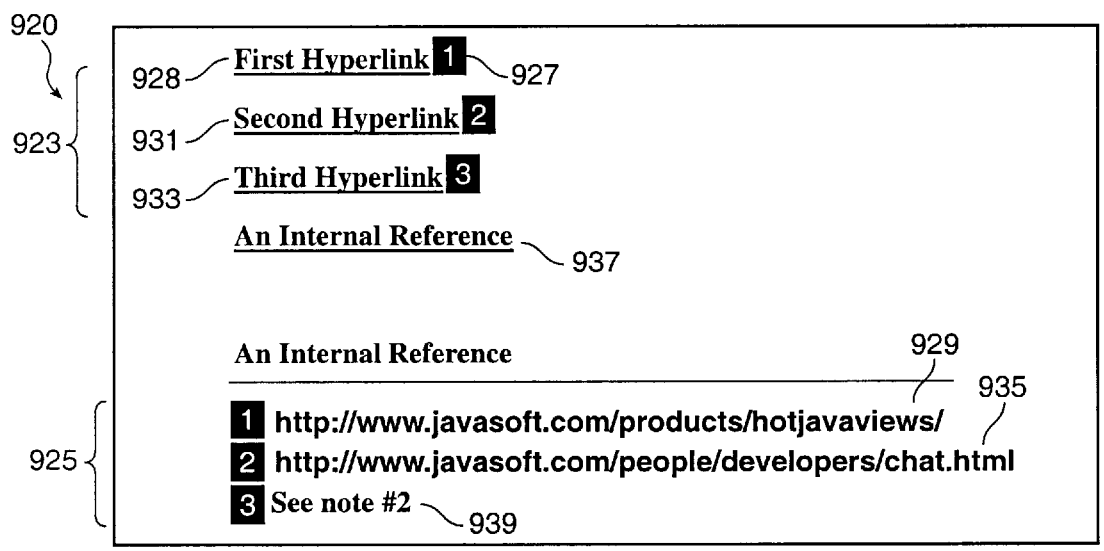
Figure 9C:
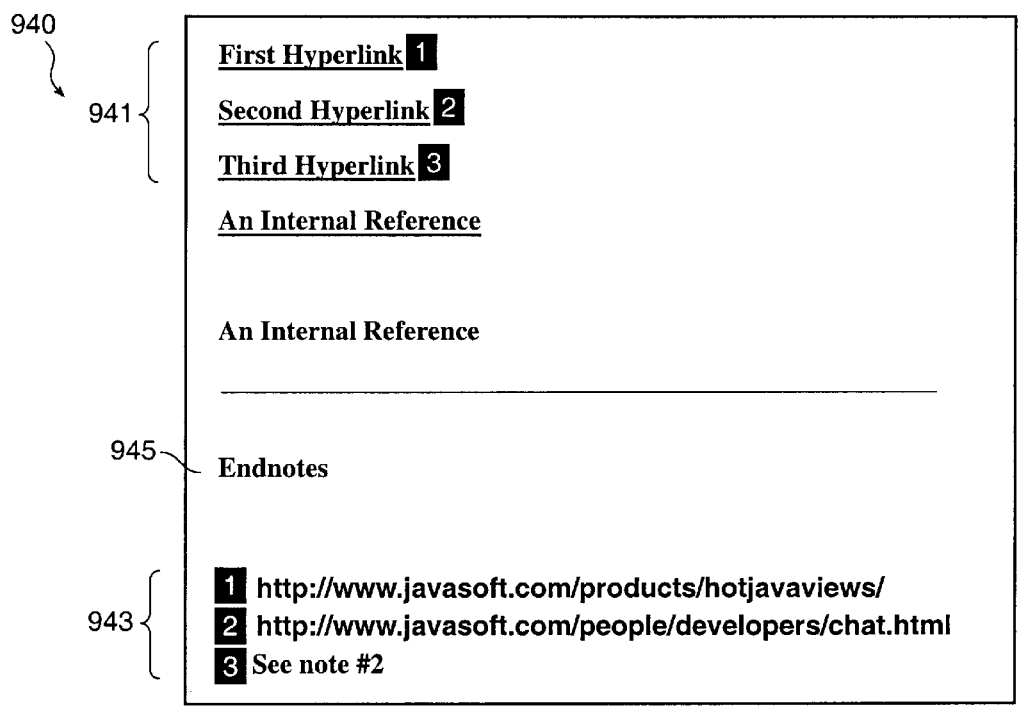

FIG. 9a illustrates an archived hypertext page using embedded references as indicated by general reference character 900. For illustration purposes the information in the archived hypertext page 900 is delimited by a border 901 that is generally not printed when a hypertext page is archived. This border is also shown in FIG. 9b and FIG. 9c but without reference characters. A plurality of relevant hyperlinks 903 are presented along with an irrelevant hyperlink 905. The irrelevant hyperlink 905 is irrelevant only in that it indicates a hyperlink to an anchor within the base document. A first embedded note 907 provides the URL of a first hyperlink text 909 and is printed after the first hyperlink text 909. Notice that the first embedded note 907 is an absolute URL and not the relative URL as provided by the relative hyperlink anchor 103. A second embedded note 911 provides the URL of a second hyperlink text 913 and is printed after the second hyperlink text 913. Thus, an archived version of a hypertext document contains the URL associated with the hyperlink such that the reader can access the linked information after reading the archived document.

FIG. 9b illustrates an archived hypertext page using footnotes as indicated by general reference character 920. A plurality of relevant hyperlinks 923 are associated with a plurality of footnotes 925. This association is made by appending a footnote reference character 927 to the display text of a first relevant hyperlink 928. The footnote reference character 927 associates a first footnote 929 with the first relevant hyperlink 928. Similar associations occur for a second relevant hyperlink 931 and a third relevant hyperlink 933. A second footnote 935 is associated with the second relevant hyperlink 931. Once again, an irrelevant hyperlink 937 is not associated with any of the plurality of footnotes 925. Assuming that the URL for the second relevant hyperlink 931 and the third relevant hyperlink 933 are the same, a third footnote 939 simply refers back to the second footnote 935. Each page of the archived document includes the plurality of footnotes 925 that are associated with the plurality of relevant hyperlinks 923 resident on the page. If required, the invention can continue a footnote on a subsequent page using methods well understood in the art. Thus, an archived version of a hypertext document contains the URL associated with the hyperlink such that the reader can access the linked information after reading the archived document.

FIG. 9c illustrates an archived hypertext page using endnotes as indicated by general reference character 940 that includes a plurality of relevant hyperlinks 941 and a plurality of endnotes 943. In a preferred embodiment, the plurality of endnotes 943 are printed after an endnote header 945. FIG. 9c is very similar to FIG. 9b when printing a single-page hypertext. However, the operation of the invention on a multiple page hypertext document delays the printing of the plurality of endnotes 943 until all the pages of the multiple page hypertext document have been printed. Then the endnote header 945 is printed followed by the plurality of endnotes 943. Thus, an archived version of a hypertext document contains the URL associated with the hyperlink such that the reader can access the linked information after reading the archived document.

One skilled in the art will understand that the previously described invention teaches a method, system, apparatus, and programming product that provides a facility for readers to know the URL associated with a hyperlink when reading an archived hypertext document.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for archiving a hypertext document containing a hyperlink definition, wherein said method comprises:

detecting said hyperlink definition within said hypertext document; and archiving a portion of said hyperlink definition, said portion consisting of less than the entirety of said hyperlink definition.

2. The computer controlled method of claim 1 wherein said portion is a path specification string.

3. The computer controlled method of claim 1 wherein said archiving further comprises:

printing said portion of said hyperlink definition.

4. The computer controlled method of claim 3 wherein said printing further comprises:

printing said portion of said hyperlink definition as a footnote.

5. The computer controlled method of claim 3 wherein said printing further comprises:

printing said portion of said hyperlink definition as an endnote.

6. The computer controlled method of claim 3 wherein said printing further comprises:

printing said portion of said hyperlink definition as an embedded note.

7. The computer controlled method of claim 1 wherein said detecting further comprises:

storing an image of said portion of said hyperlink definition in a filestorage mechanism.

8. An apparatus having a central processing unit (CPU) and a memory coupled to said CPU for archiving a hypertext document containing hyperlink definition, said apparatus comprising:

a hypertext detection mechanism configured to detect said hyperlink definition within said hypertext document; and a hypertext archival mechanism configured to archive a portion of said hyperlink definition detected by the hypertext detection mechanism, said portion consisting of less than the entirety of said hyperlink definition.

9. The apparatus of claim 8 wherein said portion is a path specification string.

10. The apparatus of claim 8 wherein the hypertext archival mechanism comprises:

a printing mechanism configured to print said portion of said hyperlink definition.

11. The apparatus of claim 10 wherein the printing mechanism further comprises a footnote printing mechanism configured to print said portion of said hyperlink definition as a footnote.

12. The apparatus of claim 10 wherein the printing mechanism further comprises an endnote printing mechanism configured to print said portion of said hyperlink definition as an endnote.

13. The apparatus of claim 10 wherein the printing mechanism further comprises an embedded note printing mechanism configured to print said portion of said hyperlink definition as an embedded note.

14. The apparatus of claim 8 wherein the hypertext archival mechanism comprises:

a storage mechanism configured to store an image of said portion of said hyperlink definition in a filestorage mechanism.

15. A computer program product comprising:

a computer usable storage medium having computer readable code embodied therein for causing a computer to archive a hypertext document containing a hyperlink definition, said computer readable code comprising:

computer readable program code devices configured to cause said computer to effect a hypertext detection mechanism configured to detect said hyperlink definition within said hypertext document; and computer readable program code devices configured to cause said computer to effect a hypertext archival mechanism configured to archive a portion of said hyperlink definition detected by the hypertext detection mechanism, said portion consisting of less than the entirety of said hyperlink definition.

16. The computer program product of claim 15 wherein said portion is a path specification string.

17. The computer program product of claim 15 wherein the hypertext archival mechanism comprises:

computer readable program code devices configured to cause said computer to effect a printing mechanism configured to print said portion of said hyperlink definition.

18. The computer program product of claim 17 wherein the printing mechanism further comprises computer readable program code devices configured to cause said computer to effect a footnote printing mechanism configured to print said portion of said hyperlink definition as a footnote.

19. The computer program product of claim 17 wherein the printing mechanism further comprises computer readable program code devices configured to cause said computer to effect an endnote printing mechanism configured to print said portion of said hyperlink definition as an endnote.

20. The computer program product of claim 17 wherein the printing mechanism further comprises computer readable program code devices configured to cause said computer to effect an embedded note printing mechanism configured to print said portion of said hyperlink definition as an embedded note.

21. The computer program product of claim 15 wherein the hypertext archival mechanism comprises:

computer readable program code devices configured to cause said computer to effect a storage mechanism configured to store an image of said portion of said hyperlink definition in a filestorage mechanism.

\* \* \* \* \*